RECORD CHANGER SPINDLE

Filed March 22, 1946 2 Sheets-Sheet 1

INVENTOR.
WALTER MILLER
BY JAMES L. D. MORRISON
Fred C. Geiger
ATTORNEY

Sept. 19, 1950 W. MILLER ET AL 2,523,045

RECORD CHANGER SPINDLE

Filed March 22, 1946 2 Sheets-Sheet 2

INVENTORS
WALTER MILLER
JAMES L. D. MORRISON

BY Fred C. Geiger
ATTORNEY

Patented Sept. 19, 1950 2,523,045

UNITED STATES PATENT OFFICE 2,523,045

RECORD CHANGER SPINDLE

Walter Miller and James L. D. Morrison,
Benton Harbor, Mich.

Application March 22, 1946, Serial No. 656,435

7 Claims. (Cl. 274—10)

The present invention relates to record ejectors used on an offset spindle type of record changers, wherein the records are held in a stack on the spindle over the offset ledge or step of the spindle. The lowermost record is automatically slipped sideways over the ledge and released at the proper time in the record cycle, so as to bring it down to the turntable below, where it is to be played.

The conventional offset spindle and ejector had serious defects in that the center hole in the records would wear unreasonably for the following reasons: (1) the edge of the center hole wore away because the record was slid over the shoulder or ledge on the spindle with all the weight of the remaining records on top of it, (2) when the ejector finger returned inside the spindle all the remaining records dropped by gravity onto the ledge, and since the ledges presented a very small area and the weight of the usual stack of records was considerable, the record was frequently cracked and broken around the center hole, and (3) when the ejector finger returned inside the spindle, it tended to abrade the record above it and also cause wear on the center hole.

The object of the present invention is to construct an ejector which will eliminate one or more of the above defects.

A further object is to improve the form and operation of the conventional ejector in an offset spindle so as to ease the drop of the stack of records on the spindle ledge as the lowermost record is ejected over the ledge so as to reduce wear on the records around the center holes due to such drop.

A still further object of the present invention is the provision of forming an ejector so as to keep a record from prematurely sliding over the ledge.

A still further object of the present invention is to construct an ejector which will lift the stack of records off the ledge before sliding the lowermost record, bring the remainder of the stack gently down to the ledge, and lower the lowermost record below the level of the stack before moving back into the spindle to release said record, whereby all the defects referred to above are eliminated.

Other objects will appear in the following detailed description of this invention, having reference to the accompanying drawings, wherein.

Figures 1, 2, 3, 4, 5, 6, 7:
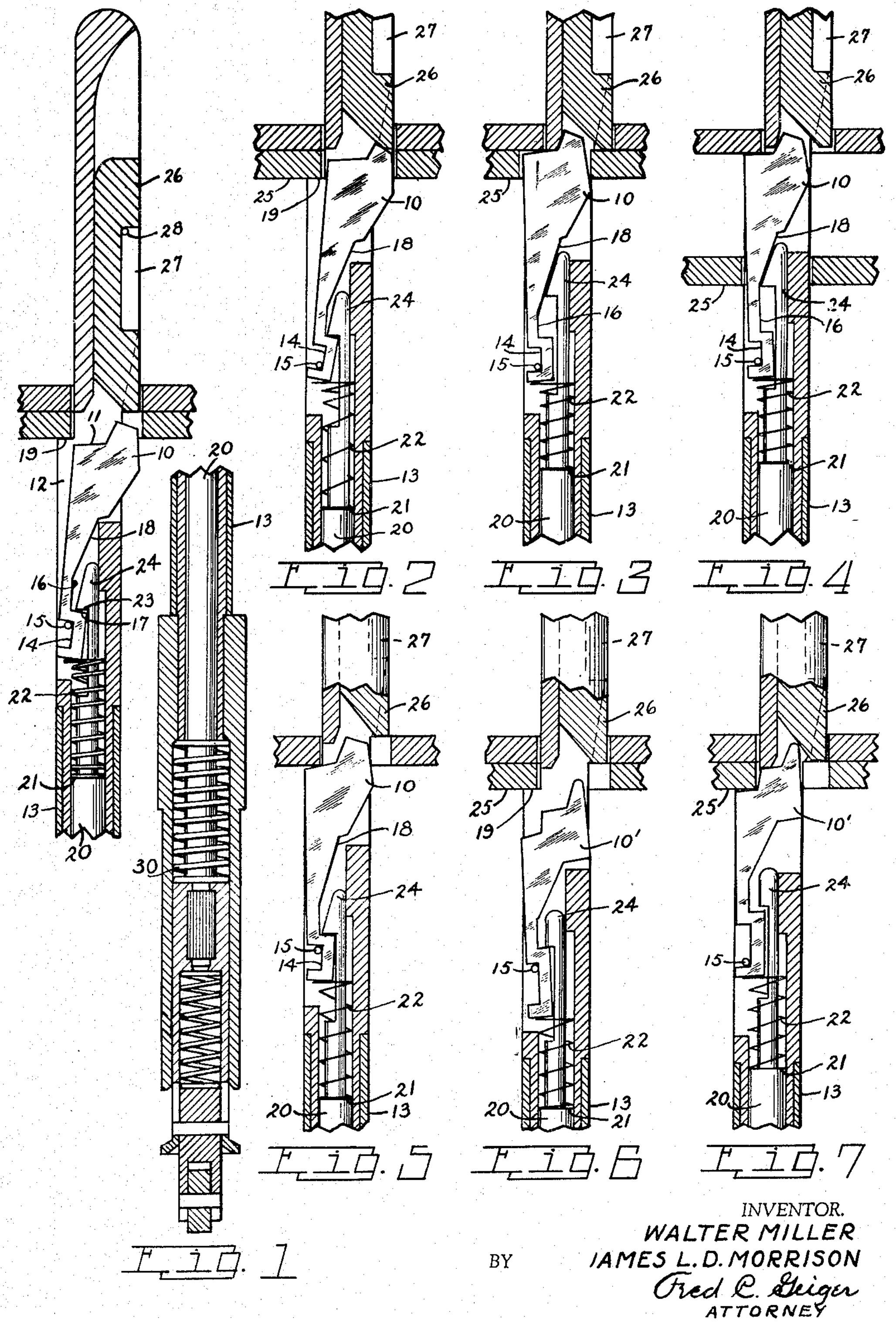
Figure 1 is a sectional view of an improved ejector mechanism in an offset spindle made in accordance with this invention.
Figures 2 to 5 are partial sectional views of the same in consecutive positions of operation.
Figures 6 to 10 are similar sectional views of another form of ejector in five consecutive positions showing the operation of this form.

The ejector mechanism shown in Figures 1 to 5 includes the flat ejector 10 formed as shown and slidably operating in a slot 12 of the offset spindle 13. The lower and narrow end of the ejector has a groove 14 in one edge, cooperating with a pin 15 to permit the ejector a limited amount of axial displacement as well as pivotal movement within said slot. The opposite edge of the ejector has a groove 16 bounded by a shoulder 17 at its lower end and a tapered surface 18 at its upper end. The upper or wide end of the ejector has a stepped portion 11 corresponding to the step 19 of the offset spindle.

A push rod 20 slidably mounted in a bore in the lower part of the spindle is reciprocated in properly timed relation to the cycle of operations of the record changer, and has a shoulder 21, between which and the lower end of the ejector 10 a coil spring 22 is compressed to normally urge the ejector upwardly so that its shoulder 17 rests against a projection 23 near the end of the push rod 20 and so that the ejector is turned into its retracted position, as shown in Figure 1.

When the push rod is operated, it first moves upwardly, moving the ejector with it until the pin 15 reaches the end of its groove as shown in Figure 2, when the upward travel of the ejector is arrested. As the push rod continues its upward stroke the wedge end 24 of the push rod presses against the tapered surface 18 and pushes the ejector pivotally about the pin 15 into its extended position, as shown in Figure 3, thus the stepped portion 11 pushes the lowermost record 25 in the stack over the step 19 of the offset spindle and permits it to drop to the turntable below while the rest of the stack is held by the stepped portion 11 of the ejector which has wedged itself in the meantime under the next record, as shown in Figure 4.

On the down stroke of the push rod, the stack is brought gently down to the step of the offset spindle as shown in Figure 5, then the projection 23 on the end of the push rod with the assistance of the force of the spring 30 and the spring 22 returns the ejector 10 pivotally about pin 15 into its retracted normal position, as in Figure 1.

The follower 26 operates in an extension of the slot 12 in the upper end of the offset spindle and has a groove 27 in its outer edge, through which groove a pin 28 is passed for limiting the vertical motion of the follower so that in its lowermost position it will be extended downwardly to the top of the lowermost record in the stack, thus preventing the rest of the stack from sliding with the lowermost record 25 as it is pushed over the step of the offset spindle by the ejector.

Figure 8:
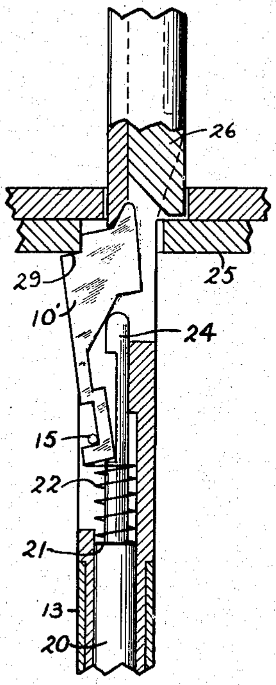
Figure 9:
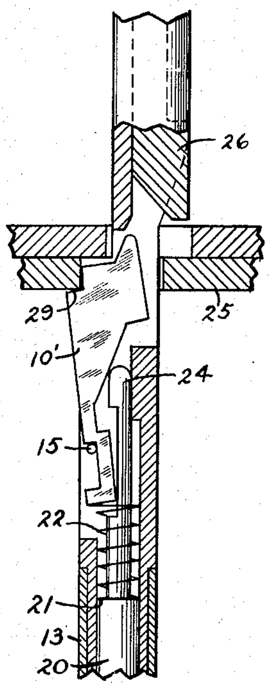
Figure 10:
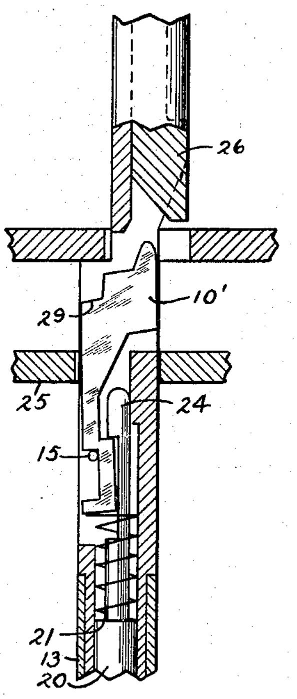
Figure 11:
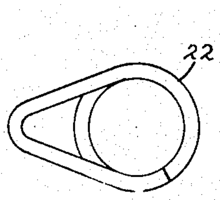
Figure 11 is a top plan view of the ejector spring.
Figure 12:
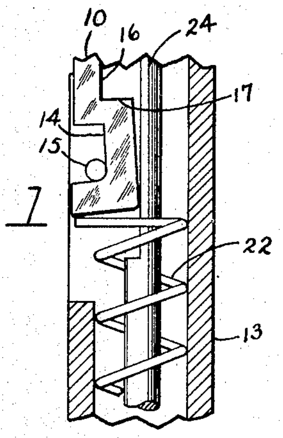
Figure 12 is an enlarged view illustrating the spring parts being broken.

The modification shown in Figures 6 to 10 is formed similarly to the ejector mechanism already described and operates in the same manner, except that an additional projecting stepped portion 29 is formed on the upper wide end of the ejector 10′ for the purpose of catching under the whole stack of records during the upstroke of the push rod as shown in Figure 7, thus to slightly raise the stack, relieving the pressure of the lowermost record on the step of the offset spindle before this record is slid over said step as shown in Figure 8, so as to prevent wear on the center opening of the records due to this pressure. After the lowermost record is slid over, the whole stack is gently lowered as shown in Figure 9, so that the rest of the stack above the lowermost record rests on the step of the offset spindle, while the lowermost record is lowered to a position spaced from the remainder of the stack before the ejector is retracted into the slot as shown in Figure 10, so as to permit the record to drop to the turntable below by sliding the shoulder 29 into the center opening of the record.

It will be noted that while the form of device shown in Figures 1 to 5 eliminates defects (2) and (3) referred to in the second paragraph of this specification, the form shown in Figures 6 to 10 eliminates all three defects enumerated.

The forms of devices illustrated herein may be modified in details of structure and arrangement in accordance with different design requirements, without departing from the spirit and scope of this invention as defined in the appended claims.

What is claimed is:

1. A record changer comprising: a spindle provided with an offset for supporting a stack of records; an ejector in the spindle provided with means for displacing the lowermost record transversely from the offset and a member for underlying and supporting the records in a stack following displacement of the lowermost record, the ejector being movable transversely of the spindle for displacing the lowermost record from the offset and movable vertically to support and lower the records supported on said member; an element movable vertically in the spindle, provided with means for moving the ejector upwardly into position to support the records above the lowermost record and for controlling the lowering of the ejector and with means for transversely shifting the ejector to displace a record from the offset; and means for operating said element to shift the ejector upwardly and transversely to displace a record from the offset and controlling the lowering movement of said element and ejector while records are supported on said member and until they are supported on the offset, and thereby controlling the downward velocity of the stack of records to prevent severe impact of the records on the offset.

2. A record changer comprising: a spindle provided with an offset for supporting a stack of records; an ejector in the spindle provided with means for displacing the lowermost record transversely from the offset and a member for underlying and supporting the records in a stack following displacement of the lowermost record, the ejector being pivotally movable transversely of the spindle for displacing the lowermost record from the offset and bodily movable vertically to support and lower the records supported on said member; an element movable vertically in the spindle, provided with means for moving the ejector bodily upward into position to support the records above the lowermost record and for controlling the lowering of the ejector and with means for pivotally shifting the ejector to displace a record from the offset; and means for operating said element to shift the ejector bodily upward and pivotally to displace a record from the offset and controlling the lowering movement of said element and ejector while records are supported on said member and until they are supported on the offset, and thereby controlling the downward velocity of the stack of records to prevent severe impact of the records on the offset.

3. A record changer comprising: a spindle provided with an offset for supporting a stack of records and a transverse slot; an ejector in said slot provided with means for displacing the lowermost record transversely from the offset and a member for underlying and supporting the records in a stack following displacement of the lowermost record, the ejector being movable in said slot transversely of the spindle for displacing the lowermost record from the offset and movable vertically in said slot to support and lower the records supported on said member; an element movable vertically in the spindle, provided with means for moving the ejector upwardly into position to support the records above the lowermost record and for controlling the lowering of the ejector, and with means for transversely shifting the ejector to displace a record from the offset; and means for operating said element to shift the ejector upwardly and transversely to displace a record from the offset and controlling the lowering movement of said element and ejector while records are supported on said member and until they are supported on the offset, and thereby controlling the downward velocity of the stack of records to prevent severe impact of the records on the offset.

4. A record changer comprising: a spindle provided with an offset for supporting a stack of records, a transverse slot and a bore; an ejector in said slot provided with means for displacing the lowermost record transversely from the offset and a member for underlying and supporting the records in a stack following displacement of the lowermost record, the ejector being pivotally movable transversely of the spindle for displacing the lowermost record from the offset and bodily movable vertically in said slot to support and lower the records supported on said member; an element movable vertically in the bore of the spindle, provided with means for moving the ejector upwardly into position to support the records above the lowermost record and for controlling the lowering of the ejector and with means for pivotally shifting the ejector to displace a record from the offset; and means for operating said element to shift the ejector upwardly and pivotally to displace a record from the offset and controlling the lowering movement of said element and ejector while records are supported on said member and until they are supported on the offset, and thereby controlling the downward velocity of the stack of records to prevent severe impact of the records on the offset.

5. A record changer comprising: a spindle provided with an offset for supporting a stack of records, a transverse slot and a bore; an ejector in the slot provided with means for displacing the lowermost record transversely from the offset and a member for underlying and supporting the records in a stack following displacement of the lowermost record, the ejector being pivotally movable transversely in the slot for displacing the lowermost record from the offset, and bodily movable vertically while the superposed records are supported on said member; an element slidably mounted in the bore in the spindle provided with means for moving the ejector bodily upwardly into position to support the records above the lowermost record and with an abutment for pivotally shifting the ejector to displace the lowermost record from the offset; and means for operating said element in the bore to shift the ejector upwardly and to shift the ejector by said abutment, and controlling the lowering of the abutment and the ejector while records are supported on said member and until they are supported on the offset, and thereby controlling the downward velocity of the stack of records to prevent severe impact of the records on the offset.

6. The record changer of claim 1 with an ejector provided with a second member for underlying the lowermost record, being operated to operate said second member to raise the lowermost record above the offset before the ejector is shifted to displace the lowermost record from the offset.

7. The record changer of claim 1 with an ejector provided with a step below said underlying member and for underlaying the lowermost record, the ejector being operated to operate said step to raise the lowermost record above the offset before the ejector is shifted to displace the lowermost record from the offset.

WALTER MILLER.
J. L. D. MORRISON.

REFERENCES CITED

The following references are of record in the file of this patent:

UNITED STATES PATENTS

| Number | Country | Date |
|---|---|---|
| 2,235,693 | Wells | Mar. 18, 1941 |
| 2,287,098 | Habegger | June 23, 1942 |
| 2,293,703 | Becwar | Aug. 25, 1942 |
| 2,328,052 | Butler | Aug. 31, 1943 |
| 2,355,790 | Faulkner | Aug. 15, 1944 |

FOREIGN PATENTS

| Number | Country | Date |
|---|---|---|
| 110,303 | Sweden | Apr. 11, 1944 |